A. M. HOLTON.
COFFEE GRINDER, CLEANER, AND SEPARATOR.
APPLICATION FILED SEPT. 13, 1909.
1,069,064.
Patented July 29, 1913.
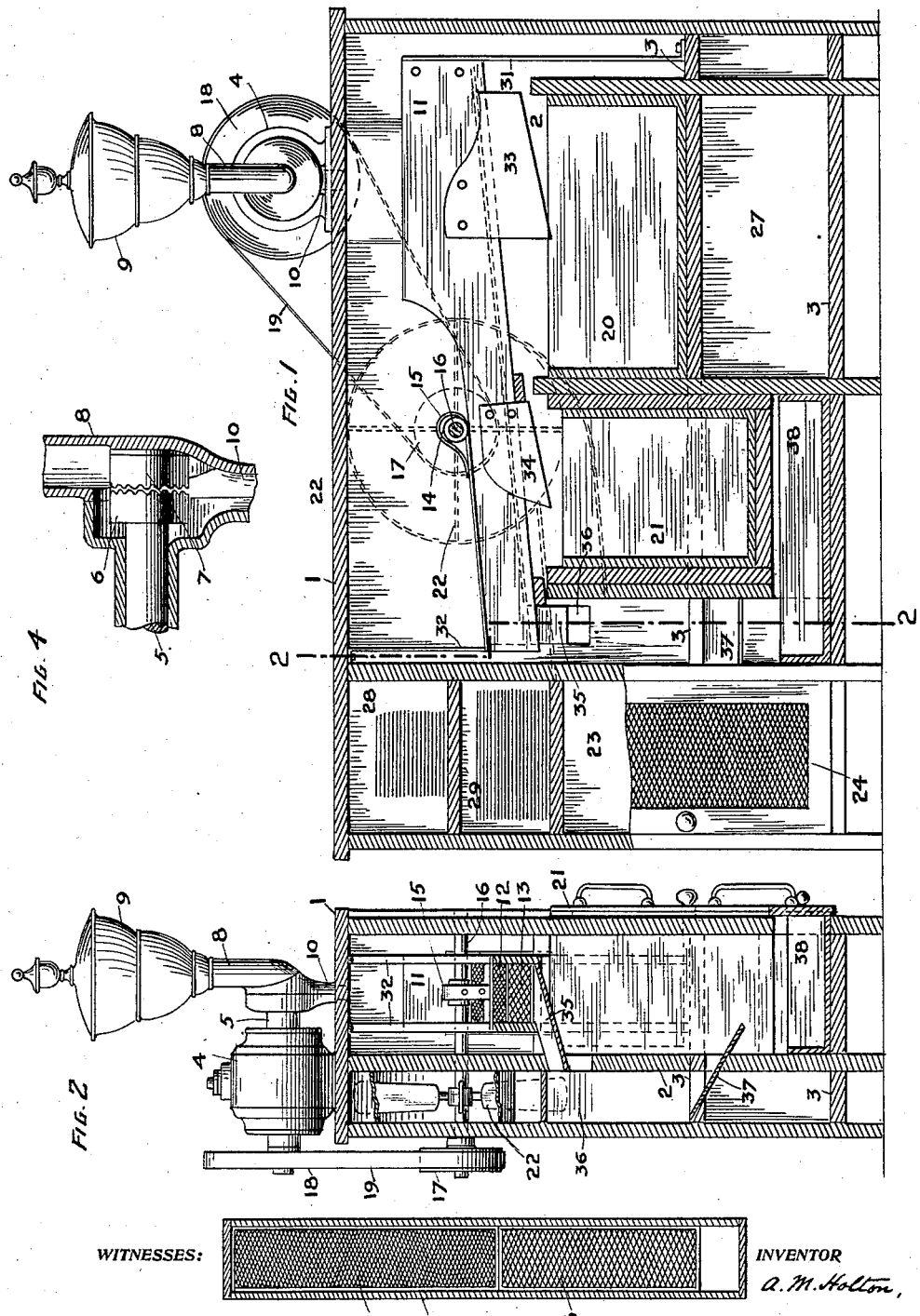
WITNESSES:
N. Keating
Leon Boillot
INVENTOR
A. M. Holton,
BY
F. M. Wright,
ATTORNEY

UNITED STATES PATENT OFFICE.

ALBERT M. HOLTON, OF SAN FRANCISCO, CALIFORNIA.

COFFEE GRINDER, CLEANER, AND SEPARATOR.

1,069,064.  Specification of Letters Patent.  Patented July 29, 1913.

Application filed September 13, 1909. Serial No. 517,387.

*To all whom it may concern:*

Be it known that I, ALBERT M. HOLTON, a citizen of the United States, residing at San Francisco, in the county of San Francisco and State of California, have invented new and useful Improvements in Coffee Grinders, Cleaners, and Separators, of which the following is a specification.

The object of the present invention is to provide an apparatus which shall be cheap and simple in construction and durable in use for grinding coffee and analogous material, and, in the same operation, grading or separating the ground particles and distributing them into different receptacles so that the particles in each receptacle shall be substantially uniform in size and character.

In the accompanying drawing, Figure 1 is a longitudinal section of the apparatus; Fig. 2 is a cross section thereof; Fig. 3 is a plan view of the bottom of the shaking box; Fig. 4 is an enlarged sectional view of the grinder.

Referring to the drawing, 1 indicates a cabinet divided longitudinally by a vertical partition 2, and horizontal partitions 3, forming chambers adapted to receive the various products derived from the operations of grinding and separating as hereinabove described. Upon the top of said cabinet is mounted the casing 4 of an electric motor, the shaft 5 of which carries a rotary grinding disk 6, between which and a stationary grinding disk 7, the material to be ground, as coffee, is charged from a passage 8, falling down said passage from a receptacle 9. A passage 10 leads from the grinding chamber through the top of the cabinet into the upper part of the interior thereof on the front side of the partition 2, the ground material falling into a box-shaped receptacle 11, open at the top except at its lower end, having a bottom sloping downward from the charging end of said box, said bottom being formed of screens 12, 13, of different sizes of mesh. Said box is supported at one end upon a bar 31 and suspended at the other by a bar 32 and is given a shaking motion by means of an eccentric 14, rotating in a collar 15, secured to the top of the box 11, said eccentric being mounted on a shaft 16, driven in any suitable manner, as by pulleys 17, 18, and a belt 19, from the shaft 5 of the electric motor. By gravity assisted by said rocking motion, the material which has been ground is slowly moved along the bottom of the box, the finest material or dust falling through the screen 12 into a discharge spout 33, discharging into a removable box 20 in the first compartment, the coarser small particles dropping through the screen 13 into a discharge spout 34, discharging into a removable box 21 in the second compartment, while the broken pieces of the berry descend from the lower end of the box into a chute 35, leading to the mouth of a conduit 36. Mounted on said shaft 16 is a blower 22 which blows the lighter, but comparatively large, material, such as chaff, silver-leaf, or woody fiber from the stream of material dropping from the chute 35 in front of the mouth of said conduit 36, and separates it from the heavier pieces of the coffee berry, blowing said light material into a compartment 23, having a screened door 24 to permit the air to pass out of said compartment. Said broken pieces of the berries drop by a chute 37 into a drawer 38. Instead of the shaft 5 being driven by an electric motor, it may be manually operated.

The cabinet is provided with a compartment or box 27 to receive chicory or other substances for compounding the product to be sold, and with compartments 28 and 29 to hold bags. The part of the top of the cabinet which is not occupied by the grinding mill furnishes a convenient place for the scales and for a sales counter.

The advantages of this invention will appear from a consideration of the character of the various infusions obtained from the different products of the ground coffee. Ground coffee consists of particles of the berry of various sizes and of chaff. Some of these particles are very many times as large as others, and consequently will require proportionately as much infusion or brewing as the smallest particles to extract therefrom the stimulating essences, consequently, if the coffee is infused when the largest and smallest particles are mixed together, by the time that the largest particles have yielded the essential oils of the coffee, the smallest ones will have passed far beyond that stage, and the continued infusion will have extracted from said smallest particles the objectionable ingredient thereof, namely, tannin, an astringent that seriously interferes with digestion, coffee made from the smallest particles having a very bitter taste, if infused as long as is proper for the granulated coffee. As to the chaff, or silver-leaf, coffee made therefrom has a flat, weedy and peculiarly nauseous taste. It follows, therefore, that if coffee is made from the ground product without grading as to character and size the different parts of said products, the infusions from the chaff and dust overpower and destroy the true aromatic flavor of the coffee berry itself, even though of the finest quality. The great utility of the present machine, therefore, resides in the fact that these constituents of the coffee are separated from each other, and are uniformly graded, so that the consumer can have the benefit of the fine aroma of fresh ground coffee, not destroyed by the extracts from the dust of the coffee, and from the chaff. If coffee made from particles of uniform size, and without chaff, be infused for the proper length of time, the true aroma of the coffee is preserved.

I claim:—

In a device of the character described, the combination of a cabinet, a sloping sieve movably supported therein, means for feeding on to the upper portion of said sieve the material to be treated, a shaft supported in the cabinet, means for rotating said shaft, an operative connection between said shaft and sieve to impart longitudinal reciprocation to the sieve from the rotary movement of said shaft, a receptacle supported in said cabinet below the sieve, said cabinet being formed with an air conduit and with a chute leading transversely into said conduit from the lower end of said sieve, said conduit having two discharge outlets, one more downwardly directed than the other, and a rotary fan mounted upon said shaft at the inlet end of said conduit and arranged to blow the lighter material in said conduit through the last-named outlet, said cabinet being provided with a second receptacle into which said last-named outlet leads, a wall of said receptacle having small perforations open to the outside atmosphere to permit the escape of air while retaining said lighter material.

In testimony whereof I have hereunto set my hand in the presence of two subscribing witnesses.

ALBERT M. HOLTON.

Witnesses:
 FRANCIS M. WRIGHT,
 D. B. RICHARDS.

---

Copies of this patent may be obtained for five cents each, by addressing the "Commissioner of Patents, Washington, D. C."